A. WICKSTROM & C. A. BORGSTROM.
SPRING WHEEL FOR VEHICLES.
APPLICATION FILED JAN. 16, 1918.
1,296,446.
Patented Mar. 4, 1919.
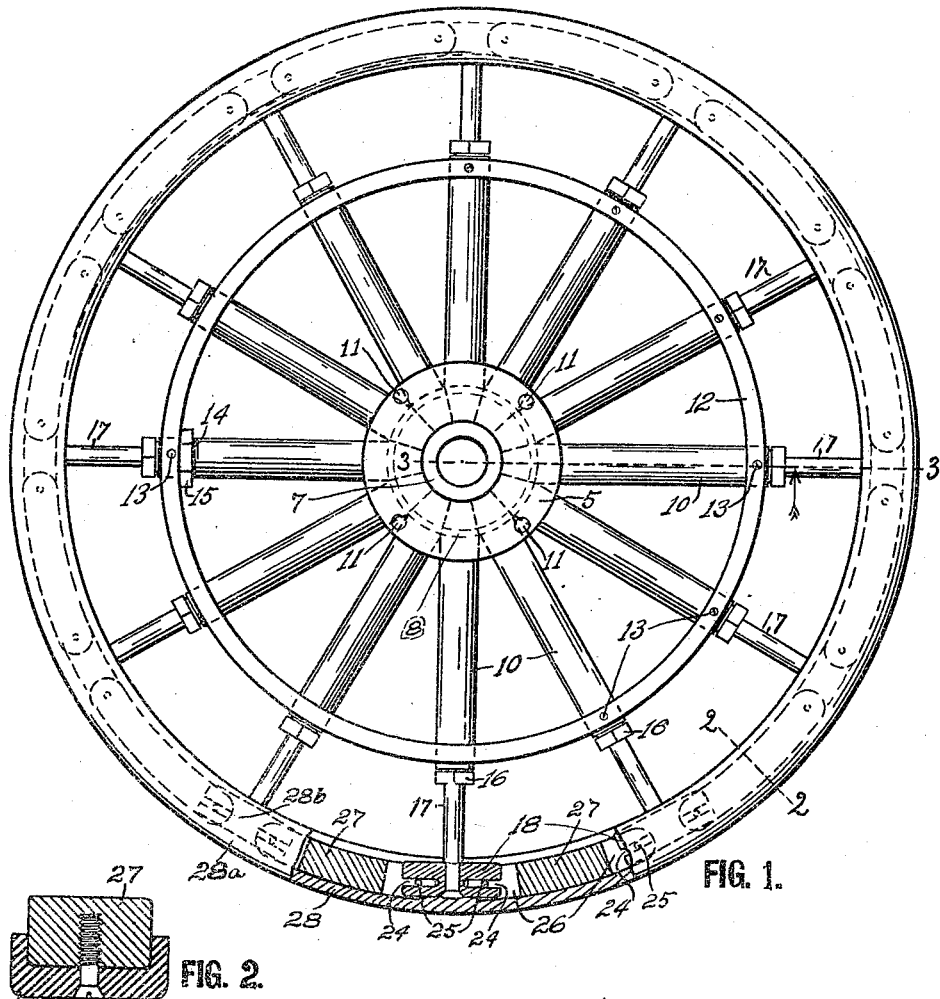
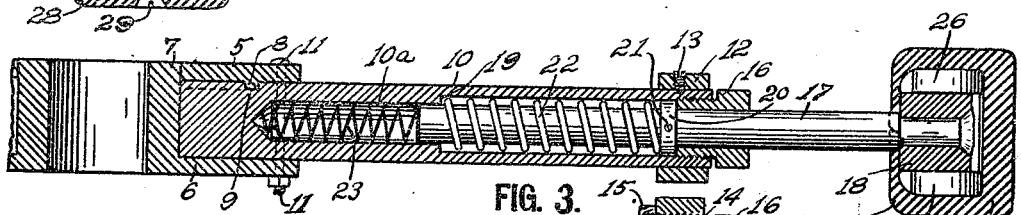
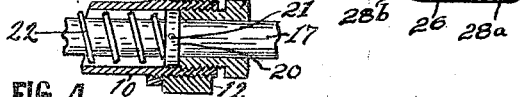
INVENTORS:
A. Wickstrom and C. A. Borgstrom
BY their ATTORNEY:
A. M. Carlsen

UNITED STATES PATENT OFFICE.

ALFRED WICKSTROM AND CARL A. BORGSTROM, OF MINNEAPOLIS, MINNESOTA.

SPRING-WHEEL FOR VEHICLES.

1,296,446.  Specification of Letters Patent.  Patented Mar. 4, 1919.

Application filed January 16, 1918. Serial No. 212,120.

*To all whom it may concern:*

Be it known that we, ALFRED WICKSTROM and CARL A. BORGSTROM, subjects of the King of Sweden, residing at Minneapolis, in the county of Hennepin and State of Minnesota, have invented a new and useful Spring-Wheel for Vehicles, of which the following is a specification.

Our invention relates to improvements in spring wheels for automobiles and other vehicles; and the object is to provide an efficient and practical vehicle wheel in which springs act as a substitute for a pneumatic tire, and thereby obviates the great troubles resulting from puncturing of pneumatic tires.

In the accompanying drawing Figure 1 is a partly sectional side elevation of a vehicle wheel embodying our invention. Fig. 2 is a cross sectional view of a modified form of the invention, the section being taken in the position of line 2—2, Fig. 1. Fig. 3 is an enlarged section on the line 3—3 in Fig. 1. Fig. 4 is a modification of the portion shown directly above it in Fig. 3.

Referring to the drawing by reference numerals, the hub of the wheel is composed of two disk-shaped members 5 and 6, the latter of which carries the hub proper 7, fitting in a central aperture of the member 5. One of said disks is provided at its inner side with a concentric rib 8, which fits into recesses 9 formed in tubular spoke sections 10, which are firmly held between the disks when the latter are secured together by bolts 11 passed through them.

Each tubular spoke section 10 has its outer end secured in a ring 12, which extends concentrically between the hub and the rim of the wheel. The means by which they are secured may be much varied; thus each spoke may be held by a set screw as 13, (see Figs. 1 and 3) or by having a portion 14 threaded into the ring and secured by a jam nut 15 (see Fig. 4, and at the extreme left spoke in Fig. 1, where both the means, 13 and 15 are shown as employed).

Slidably fitted in the inner reduced portion 10ª of each spoke section 10 and in a collar 16 partly threaded into the outer end thereof, is a solid spoke section or member 17, whose outer end is fixed in one of the sections 18 of the rim. Partly compressed between a shoulder 19 in the tubular spoke section and a collar 20 held by a pin 21 is a coil spring 22, and for heavy vehicles another spring 23 is inserted in the reduced portion 10ª of the section 10.

Each rim section or block 18 is provided in each end with a gap 24, in which is loosely fitted a pivot 25; said pivot is fixed in the ears 26 of the next rim section 27, which has bifurcated ends forming said ears and an intermediate gap receiving the ends of the narrower and shorter sections 18. The chain-like felly or rim thus produced is given a solid flexible tire 28, which may have the simple form shown in Fig. 2 and be secured by screws 29 to the rim sections, or in a better grade of the device the tire may be, like 28ª in Figs. 1 and 3, formed with a flexible casing 28ᵇ which keeps sand and dirt out of the joints of the rim.

In the operation of the wheel, it may be used either as a driver or a mere steering and supporting wheel, and to make the parts of the spoke work easily and without noise the collars 16 may once in a while be unscrewed and plenty of oil or other grease poured into the spoke so as to lubricate the springs and other moving parts, whereupon the collar is screwed home again.

In driving over uneven grounds or in hauling loads the springs 22 and 23 may become more or less compressed by the blocks 18 and 27 that happen to be nearest the ground, but this causes no side strain on the spokes, because of the freedom of motion by the pins or pivots 25 in the gaps 24. The same is true of the slight longitudinal movement of the rim sections in front and rear of the center of the wheel when the wheel hub and horizontal spokes move slightly up and down owing to the compression of the springs in the vertically disposed spokes.

What we claim is:—

1. A vehicle wheel comprising a hub, a rim composed of alternate short and long sections, and an intermediate ring disposed concentrically between the hub and the rim, spokes consisting of tubular sections securely mounted in the ring and hub, and spring pressed plunger sections respectively secured at their outer ends to the short sections of the rim and adapted to slide with their inner ends in the tubular sections, said short rim sections having each end provided with a gap, said long rim sections having bifurcated ends adapted to straddle the ends of the short sections and provided in the bifurcations with pins adapted to slide in the gaps of the short rim sections.

2. A vehicle wheel comprising a hub, a rim composed of alternate short and long sections, and an intermediate ring disposed concentrically between the hub and the rim, spokes consisting of tubular sections securely mounted in the ring and hub, plunger sections respectively secured at their outer ends to the short sections of the rim and adapted to slide with their inner ends in the tubular sections, a main spring and an auxiliary spring mounted within each tubular section and adapted to yieldingly resist the inward movement of the plunger section; said short rim sections having each end provided with a gap, said long rim sections having bifurcated ends adapted to straddle the ends of the short sections and provided in the bifurcations with pins adapted to slide in the gaps of the short rim sections.

In testimony whereof we affix our signatures.

ALFRED WICKSTROM.
CARL A. BORGSTROM.

Copies of this patent may be obtained for five cents each, by addressing the "Commissioner of Patents, Washington, D. C."